United States Patent [19]
Olsen

[11] 3,784,771
[45] Jan. 8, 1974

[54] HIGH-VOLTAGE PISTON ACTUATED SWITCH WITH ROTATIONAL SYMMETRY AND LIGHT BEAM INDICATING MEANS

[75] Inventor: Willi Olsen, Berlin, Germany
[73] Assignee: Siemens Aktiengesellschaft, Munich, Germany
[22] Filed: July 20, 1972
[21] Appl. No.: 273,611

[30] Foreign Application Priority Data
July 29, 1971   Germany................... P 21 38 456.5

[52] U.S. Cl. .......... 200/82 B, 200/148 B, 200/163, 200/167 R
[51] Int. Cl.. H01h 35/38, H01h 33/30, H01h 33/64
[58] Field of Search...................... 200/82 B, 148 B, 200/163, 48 R, 167 R, 167 A

[56] References Cited
UNITED STATES PATENTS

| | | | |
|---|---|---|---|
| 3,356,798 | 12/1967 | McKinnon | 200/48 R |
| 3,002,170 | 9/1961 | Clouthier | 200/163 |
| 2,745,952 | 5/1956 | Cabanes et al. | 200/82 B UX |
| 3,562,460 | 2/1971 | Koerner | 200/148 B |

FOREIGN PATENTS OR APPLICATIONS
1,073,218   6/1967   Great Britain ................ 200/148 B

*Primary Examiner*—Robert K. Schaefer
*Assistant Examiner*—Robert A. Vanderhye
*Attorney*—Hugh A. Chapin

[57] ABSTRACT

A metal-clad, high-voltage switchgear assembly is disclosed for an electrical conductor wherein the rotational symmetry of the electric field of the conductor is maintained. The switchgear assembly has a metal enclosure containing the conductor arranged to extend along the axis of the enclosure. The conductor is supported with respect to the enclosure by disc-shaped insulators that partition the enclosure into fluid-tight compartments separated from each other. A disconnect switch is arranged at a gap in the line of the conductor, the gap being defined by mutually adjacent end portions of the conductor. The switch includes a cylinder formed in one of the end portions of the conductor so as to define a cylinder chamber that communicates with the compartments. A piston switching member is slideably mounted in the cylinder and moves to mutually connect and disconnect the end portions of the conductor in response to changes in fluid pressure in the compartments.

15 Claims, 1 Drawing Figure

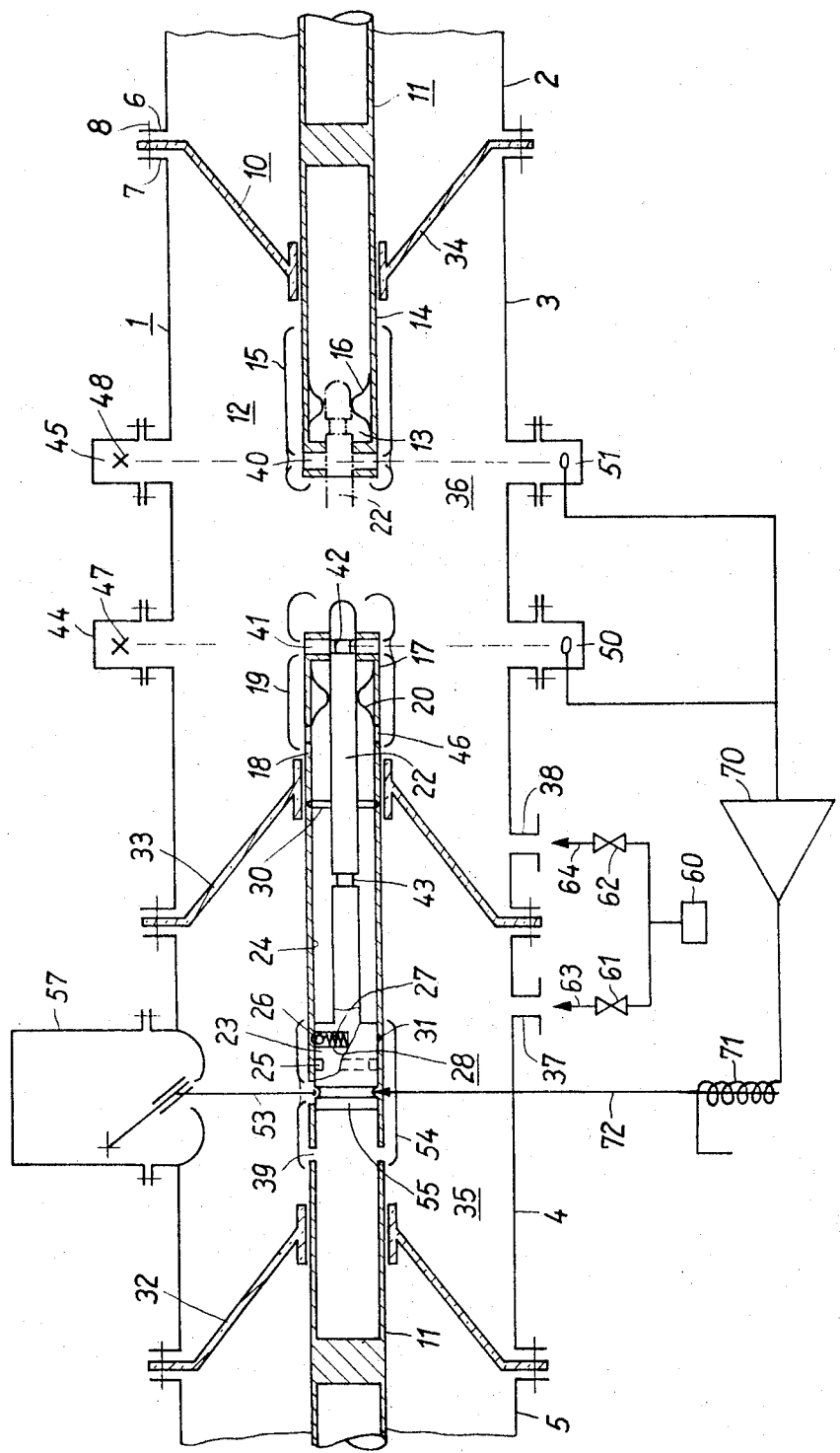

HIGH-VOLTAGE PISTON ACTUATED SWITCH WITH ROTATIONAL SYMMETRY AND LIGHT BEAM INDICATING MEANS

BACKGROUND OF THE INVENTION

The invention relates to a metal-clad, high-voltage switchgear assembly in which rotational symmetry for the electric field is obtained and in which the parts making up the disconnect switch of the assembly do not develop undesirable mechanical stresses.

German Pat. No. 955,794 discloses a metal-clad, high-voltage switching installation equipped with a conductor which extends in the interior of the encapsulating enclosure along the enclosure axis and is supported with respect to the enclosure by disc-shaped insulators. In this context, the term disc-shaped is understood to mean the insulators fill the cross-section of the enclosure completely at their respective locations and thereby partition the enclosure into separate compartments that are fluid tight. Partitioning the enclosure in this manner, makes it possible to move a conductor portion serving as the movable contact member of a disconnect switch by alternate action upon the compartments. The conductor portion if guided in the inside of the enclosure by a movable, disc-shaped insulator.

The movable insulator acts as the piston for the movable contact member of the disconnect swith and this, however, develops considerable mechanical stress. Also insulation must be provided for the full voltage between the grounded metal encapsulating enclosure and the conductor which is at high voltage. This task is made more difficult because the surfaces of the insulating bodies can become contaminated by the unavoidable abrasion which occurs when the piston slides along the encapsulating enclosure.

It is known from German Pat. No. 913,915 to move the thrust-action disconnect switch of a metal-clad, high-voltage switching installation of means of a ring piston inside the enclosure. However, the ring piston here reduces the spacing available for insulation between the conductor and the encapsulation.

In still other arrangements, a rotatable or slidable driving insulator is used to actuate the switch. However, the one-sided arrangement of the insulator results in distortion of the electrical field which is rotationally symmetrical and coaxial so that here too, the optimum dielectric strength cannot be achieved.

SUMMARY OF THE INVENTION

It is an object of the invention to provide a metal-clad, high-voltage switchgear assembly for an electrical conductor which does not distort the rotational symmetry of the electric field of the conductor. It is another object of the invention to provide a switchgear assembly which is free of the difficulties associated with the switchgear of the above cited German patents.

In the switchgear of German Pat. No. 955,794, for example, difficulties based on reasons of mechanical stress arise which can be overcome without the need of detracting from the desired rotational symmetry of the coaxial arrangement.

According to a feature of the switchgear assembly of the invention, insulating spacers hold the conductor so as to extend along the longitudinal axis of the assembly enclosure in spaced relation to the inner wall thereof. The spacers also partition the enclosure into at least two separate compartments fluid-tight with respect to each other. A pressure fluid supply alternatively supplies fluid to the compartments for establishing therein selected respective values of fluid pressure. The disconnect switch of the assembly is arranged at a gap in the line of the conductor, the gap being defined by mutually adjacent end portions of the conductor. The disconnect switch includes a cylinder formed in one of the end portions of the conductor so as to define a cylinder chamber communicating with the compartments. A piston switching member is also provided and it is slideably mounted in the cylinder for moving to mutually connect and disconnect the end portions of the conductor in response to changes in fluid pressure in the compartments.

In the switching assembly according to the invention, the one part of the enclosure which is partitioned off by the disc-shaped insulators is loaded with the pressure medium; this condition also obtains in the switch arrangements of the prior art referred to above. However, in the instant invention, the space between the enclosure and the conductor serves only as a transfer passage through which the pressure medium passes to enter the hollow conductor. Only there is the piston for the movable contact member provided. The piston is thus entirely at the high-voltage potential, so that it can be made completely of metal. Abrasion that might occur should not be appreciable because of the substantially smaller diameter and is dielectrically unimportant because the space inside the conductor is field-free. On the other hand, the truly rotation-symmetrical configuration is maintained as desired. The slightly larger cost of pressurized gas required to operate the disconnect switch, is of no significance particularly in systems with a closed circuit for gas circulation as is the case in metal-clad, high-voltage switchgear installations equipped with a dual-pressure gas circuit breaker as the power circuit breaker. The pressure differentials need to be only relatively small in the switching assembly according to the invention because the forces required for the switching are small and the diameter of the conductor still affords a considerable piston area.

Preferably, the piston has a detent which cooperates with depressions in the interior of the conductor. The detent can, for instance, be constructed as a spring-loaded ball. It needs to hold only small forces, as the purpose is only to secure the end positions of the movable contact member against displacements caused by vibrations or the like. In switching assemblys wherein the contact member is movable in the vertical direction, the detent must in addition support the weight of the movable contact member.

In the conductor and in the movable contact member corresponding openings and/or passages can be provided at specified points with which the position of the disconnect switch can be monitored. For this purpose, observation windows in the enclosure corresponding to the passages can be provided. Furthermore, one can improve the monitoring of the switch member position with radiation sources, especially light sources, disposed at the openings. By means of the above-mentioned openings, automatic monitoring for controlling a position-reporting signal or a latching arrangement can also be achieved. For such an arrangement light sources and light-sensitive semiconductors can be used to effect an actuation of relays or a latching mechanism in dependence upon the position of the movable contact member. Another feature of the invention uses a grounding pin which can be moved perpendicularly to the axis of the conductor for locking the piston in the open position of the disconnect switch.

Although the invention is illustrated and described herein as a metal-clad, high-voltage switchgear assembly, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 is a schematic diagram of the metal-clad, high-voltage switching assembly according to the invention with the disconnect switch of the assembly shown in the open position.

DESCRIPTION OF THE PREFERRED EMBODIMENTS

Referring to FIG. 1, the cylindrical, grounded metal enclosure 1 is composed of several sections 2, 3, 4, 5 etc. The sections are equipped with flanges 6 and 7 which are pressed together gas-tight by bolts 8. The interior of the enclosure is filled with sulfur hexafluoride ($SF_6$) at a pressure of 1 to 2 atm abs to increase the dielectric strength. Between the flanges 6, 7 are mounted insulating spacers 10 for supporting the cylindrical high-voltage conductor which, in turn, is disposed along the longitudinal axis of the enclosure. The conductor as a complete entity is designated with reference numeral 11. The high-voltage conductor 11 is, for example, part of a three-phase system operable at 110 KV or more with each phase being separately enclosed. The spacers 10 can be disc-like members.

A disconnect switch 12 is provided in the line of the conductor 11. The disconnect switch comprises a stationary contact portion 13 mounted at the free end 14 of the conductor 11 and is equipped with an outer shield 15. Resilient contact fingers 16 are disposed inside the shield for transferring current.

Adjacent the stationary contact portion 13 at the other end 17 of the conductor 11, there is provided a sliding contact 18 which also has a shield 19 and is equipped with contact laminations 20. In the drawing, the disconnect switch is shown in its open position and in this position the contact laminations 20 coact with a movable switching pin 22. The switching pin 22 is part of a piston disposed inside the high-voltage conductor 11. The switching pin 22 is connected to a piston 23 at its end facing away from the stationary contact 13. The switching pin 22 and piston 23 constitute piston switching means.

As shown in the drawing, the piston 23 moves on the inside 24 of the conductor 11 which acts as the cylinder chamber for the piston. A sealing groove 25 is formed in the piston 23 for accommodating an O-ring or the like and thereby, if required, provide a perfect seal between piston and cylinder.

The piston 23 also includes detent means comprising a detent 28 including a ball 26 and a spring 27 which coacts with recesses on the inside of the conductor 11 to fix the switching pin 22 at the end positions of the switching motion. The ring groove 30, for example, corresponds to the closed position of the switch where the tip of the switching pin, shown by a broken line in the drawing engages the contact fingers 16. A corresponding ring groove for the open position is shown at 31.

The disc-shaped insulators 10 are individually designated with 32, 33 and 34 in the region of the disconnect switch 12 and separate two compartments 35 and 36 from each other in a gas-tight manner. Two disconnect stubs 37 and 38 at the encapsulation 1 communicate with these compartments. The compartments 35 and 36 can thereby be selectively filled with sulfur hexafluoride at elevated pressure, for example, at a pressure of 2 to 4 atm abs.

Pressure fluid supply means for supplying the compartments 35 and 36 can include supply conduits 63 and 64 for carrying a pressure fluid to compartments 35 and 36 respectively as well as a pressure pump 60. Valve means in the form of valves 61 and 62 can be alternatively adjusted to control the supply of fluid under pressure to the compartments 35 and 36 in dependence upon the position of the movable piston and switching pin. The piston 23 with its O-ring in groove 25 partitions the cylinder chamber into two sub-chambers each varying in volume as the piston moves in the cylinder in response to changes in fluid pressure in the compartments.

If the pressure in the compartment 35 of contact member 22 is increased while the member 22 is in the position shown, the gas passes through a fluid passage means in the form of bore 39 in the conductor 11 to the rear of the piston 23 and urges the switching pin 22 into the closed position shown by the broken line when the holding force provided by the detent 28 is overcome. Any abrasion caused thereby remains inside the conductor 11. That is, the abrasion remains at high-voltage potential without any influence whatever being applied to the rotationsymmetrical arrangement which at a given voltage produces the smallest local electric field intensities.

To open the switch, the gas in compartment 35 is brought to normal pressure and the compartment 36 is filled with gas of higher pressure. The high-pressure gas passes through another fluid passage means in the form of bore 46 in the conductor 11 to the side of the piston 23 that faces the stationary contact 13. The two fluid passage means can be viewed as constituting a portion of the pressure fluid supply means. Again, an initial pressure is ensured by the detent 28 before the switching pin 22 moves back into the open position shown. The detent 28 moreover provides an advantageous fixation of the end positions of the switching motion.

As part of an arrangement for monitoring the position of the switching pin 22, there can be provided first beam passage means comprising openings 40 provided at the free end 14 of the conductor 11 and corresponding openings 41 provided at the free end 17. Corresponding to openings 40 and 41 the switching pin 22 has a second beam passage means comprising openings 42 and 43 formed therein. Radiation means comprising radiation sources 47 and 48 enclosed by portions 44 and 45 of encapsulation 1 are positioned at the encapsulation 1 opposite openings 41 and 40 respectively. The radiation sources radiate toward detection means comprising radiation-sensitive measuring apparatus 50 and 51 on the opposite side of the encapsulation.

In the open position shown, a beam can travel from 48 to 51 an from 47 to 50, so that the beam path can be used to indicate switch position when the switch is in the complete open position and for the automatic latching of the disconnect switch. An incomplete opening of the switch would be noted by the fact that only the beam from source 48 reaches apparatus 51, but not that from source 47 to apparatus 50.

For detecting the closed position, the opening 43 of the switching pin is brought into the vicinity of the opening 41 while the opening 40 is closed off by the switching pin as shown by the broken-line phantom representation of the pin; this too, therefore, provides an unequivocal position report which is suitable for interlocking with other switches or the like.

In the illustrated embodiment, the open position is further latched by a grounding pin 53 which is movable perpendicularly to the axis of the conductor and which engages through a shield 54 with a groove 55 of the piston 23 when the piston 23 moves into the open position. When disconnected, the grounding pin 53 is completely retracted into the housing 57 so as not to disturb the rotation-symmetrical field. The housing 57 is flange connected to the encapsulation 1.

For automatically latching the disconnect switch the detection means could supply an amplifier circuit 70 which, in turn, actuates a solenoid 71 having as its armature the locking pin 72. The radiation sources 47 and 48 are preferably light sources.

I claim:

1. A metal-clad, high-voltage switchgear assembly for an electrical conductor wherein the rotational symmetry of the electric field of the conductor is maintained comprising a metal enclosure having a longitudinal axis; insulating spacers for holding the conductor so as to extend along said axis inside said enclosure in spaced relation to the inner wall thereof and for partitioning said enclosure into at least two separate compartments fluid-tight with respect to each other, the conductor and said enclosure defining an unobstructed free space therebetween in each of said compartments, a disconnect switch arranged at a gap in the line of the conductor, the gap being defined by mutually adjacent end portions of the conductor, said switch including a cylinder formed in one of the end portions of the conductor and defining a cylinder chamber communicating with each of said compartments, and piston switching means slideably mounted in said cylinder so as to be movable between closed and open positions of said switch for mutually connecting and disconnecting the end portions of the conductor in response to changes in fluid pressure in said compartments; and pressure fluid supply means connected to said enclosure for alternatively supplying an electrically insulating fluid under pressure to said compartments respectively in dependence upon the position of said piston switching means whereby said free spaces in said compartments serve as respective transfer passages through which the fluid supplied to said compartments passes to said cylinder chamber for actuating said piston switching means.

2. The metal-clad, high-voltage switchgear assembly according to claim 1 wherein said spacers are disc-shaped and wherein said piston switching means comprises a piston slideably mounted in said cylinder, and a switching pin extending from said piston for engaging the other end portion of the conductor when said piston is urged by fluid pressure toward the same thereby electrically connecting the end portions of the conductor together.

3. The metal-clad, high-voltage switchgear assembly according to claim 2, said disconnect switch comprising a stationary contact in other end portion of the conductor for receiving said switching pin in electrical contact therewith.

4. The metal-clad, high-voltage switchgear assembly according to claim 3, said stationary contact comprising contact finger means engageable with said switching pin for facilitating the transfer of electric current from said pin to the other end of the conductor, and said piston switching means also comprising contact finger means mounted in said cylinder and slideably engaging said switching pin for facilitating the transfer of electric current from said pin to said cylinder and therewith to the one end portion of the conductor.

5. The metal-clad, high-voltage switchgear assembly according to claim 2, said piston partitioning said cylinder chamber into two sub-chambers each varying in volume as said piston moves in said cylinder in response to changes in fluid pressure in said compartments, and said pressure fluid supply means comprising two fluid passage means formed in the wall of said cylinder so as to extend from said compartments respectively and communicate with corresponding ones of said sub-chambers.

6. The metal-clad, high-voltage switchgear assembly according to claim 5, said pressure fluid supply means further comprising a pump for moving the fluid and building a pressure head therein, and fluid conduit means connecting said pump with said compartments, said conduit means comprising valve means for alternatively supplying the fluid under pressure to said compartments respectively and therewith to said sub-chambers.

7. The metal-clad, high-voltage switchgear assembly of claim 2, said disconnect switch comprising detent means disposed at the interface of said piston and said cylinder for fixing said closed and open positions of said movement of said piston switching means.

8. The metal-clad, high-voltage switchgear assembly of claim 7, said detent means comprising respective recesses formed in the inside wall of said cylinder at said positions, and a detent arranged in said piston and engageable with said recesses for holding said piston switching means in place at said positions respectively.

9. The metal-clad, high-voltage switchgear assembly of claim 2, comprising first beam passage means formed in the conductor at selected locations therein, and second beam passage means formed in said switching pin at selected locations therein, said second beam passage means being in alignment with said first beam passage means at said positions of movement of said piston switching means.

10. The metal-clad, high-voltage switchgear assembly of claim 9, wherein said enclosure has observation openings corresponding to said first and second beam passage means.

11. The metal-clad, high-voltage switchgear assembly of claim 9 comprising radiation means for generating a beam of radiation, said radiation means being mounted with respect to said first and second beam passage means so as to penetrate the same with said beam when the same are in alignment.

12. The metal-clad, high-voltage switchgear assembly of claim 11, said radiation means being a light source.

13. The metal-clad, high-voltage switchgear assembly of claim 11 comprising detector means arranged with respect to said first and second beam passage means for detecting said beam when said first and second passage beam means are in alignment and for providing a position report signal in response to said detected beam.

14. The metal-clad, high-voltage switchgear assembly of claim 13, comprising amplifier circuit means connected to said detector means, and electrically actuated latching means connected to said circuit means for latching said piston switching means in response to said signal from said detector means.

15. The metal-clad, high-voltage switchgear assembly of claim 2 comprising a grounding latching bar movable transverse to the conductor for engaging and latching said piston when said piston switching means has moved to disconnect the end portions of the conductor.

* * * * *